US012736919B2

(12) United States Patent
Uehara et al.

(10) Patent No.: US 12,736,919 B2
(45) Date of Patent: Sep. 15, 2026

(54) METHOD OF MANUFACTURING WATCH COMPONENT, AND WATCH COMPONENT

(71) Applicant: Seiko Epson Corporation, Tokyo (JP)

(72) Inventors: Wataru Uehara, Matsumoto (JP); Ai Yoshinaga, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 1194 days.

(21) Appl. No.: 17/512,734

(22) Filed: Oct. 28, 2021

(65) Prior Publication Data

US 2022/0137564 A1 May 5, 2022

(30) Foreign Application Priority Data

Oct. 29, 2020 (JP) ................................ 2020-181709

(51) Int. Cl.
*G04D 3/00* (2006.01)
*B44C 1/22* (2006.01)
*G04B 19/10* (2006.01)

(52) U.S. Cl.
CPC ........... *G04D 3/0092* (2013.01); *B44C 1/228* (2013.01); *G04B 19/10* (2013.01); *G04D 3/0069* (2013.01)

(58) Field of Classification Search
CPC .... G04D 3/0092; G04D 3/0069; G04B 19/10; G04B 45/0076; G04B 19/12; B23K 26/0624; B23K 26/3576; B23K 2103/05; B23K 2103/08; B23K 2103/14; B23K 26/362; B44C 1/228; B44C 3/005
See application file for complete search history.

(56) References Cited

U.S. PATENT DOCUMENTS 6,574,250 B2 * 6/2003 Sun ..................... G03F 7/70041 372/18
7,482,551 B2 * 1/2009 Sun ....................... H01S 3/0057 219/121.61
8,338,746 B2 * 12/2012 Sun .................. H01L 21/76894 219/121.72
10,295,961 B2 5/2019 Oliveira
10,649,406 B2 5/2020 Noirot et al.
2015/0049593 A1 2/2015 Oliveira
2019/0299336 A1 10/2019 Nashner
(Continued)

FOREIGN PATENT DOCUMENTS

JP 2015-020195 A 2/2015
JP 2016-173361 A 9/2016
(Continued)

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

A method of manufacturing a watch component in which while a laser irradiation unit and a base member made of metal are moved relatively, laser irradiation is performed to decorate the base member, and includes a first step of irradiating the base member with the laser to form a recessed portion in the base member, a second step of irradiating, with the laser, the base member in which the recessed portion is formed at irradiation intensity less than irradiation intensity of the first step, to clean the base member, and a third step of performing surface treatment on the base member after the cleaning.

8 Claims, 8 Drawing Sheets

(56) References Cited

U.S. PATENT DOCUMENTS

| | | | |
|---|---|---|---|
| 2020/0009891 | A1 | 1/2020 | Nashner et al. |
| 2020/0292996 | A1 | 9/2020 | Jeanrenaud et al. |
| 2020/0293001 | A1 | 9/2020 | Jeanrenaud et al. |

FOREIGN PATENT DOCUMENTS

| | | | |
|---|---|---|---|
| JP | 2016-183961 | A | 10/2016 |
| JP | 2020-049511 | A | 4/2020 |
| KR | 101336029 | B1 | 12/2013 |

* cited by examiner

X-RAY SPECTRUM OF
BASE MEMBER ILLUSTRATED IN FIG. 7B

X-RAY SPECTRUM OF
BASE MEMBER ILLUSTRATED IN FIG. 7C

METHOD OF MANUFACTURING WATCH COMPONENT, AND WATCH COMPONENT

The present application is based on, and claims priority from JP Application Serial Number 2020-181709, filed Oct. 29, 2020, the disclosure of which is hereby incorporated by reference herein in its entirety.

BACKGROUND

1. Technical Field

The present disclosure relates to a method of manufacturing a watch component, and a watch component.

2. Related Art

In the past, a watch in which a watch component such as a dial is decorated with a logo and a pattern has been known. JP 2016-183961 A discloses a method of manufacturing a watch component in which a front surface of a base member of a watch component to be decorated is dug deeply by using a femtosecond laser.

The digging using the laser is processing performed by instantaneously melting, evaporating, and scattering the front surface of the base member that has absorbed laser light. However, in the method of manufacturing a watch component described in JP 2016-183961 A, there has been a possibility that design quality of the watch component and a watch using the same is reduced, because substances scattered from the front surface of the base member become microparticles called debris and adhere to a periphery of the processed part again.

SUMMARY

A method of manufacturing a watch component is a method of manufacturing a watch component in which while a laser irradiation unit and a base member made of metal are moved relatively, laser irradiation is performed to decorate the base member, the method including a first step of irradiating the base member with the laser to form a recessed portion in the base member, a second step of irradiating, with the laser, the base member in which the recessed portion is formed at irradiation intensity less than irradiation intensity of the first step, to clean the base member, and a third step of performing surface treatment on the base member after the cleaning.

The watch component is a watch component decorated by performing laser irradiation while relatively moving a laser irradiation unit and a base member made of metal. The watch component includes the base member, a recessed portion formed by irradiating the base member with the laser, and a surface treatment layer applied to the base member cleaned by irradiating, with the laser, the base member in which the recessed portion is formed at irradiation intensity less than irradiation intensity at which the recessed portion is formed.

DESCRIPTION OF EXEMPLARY EMBODIMENTS

1. Exemplary Embodiment 1

1-1. Configuration of Watch and Watch Component

A schematic configuration of a watch including a dial as a watch component according to Exemplary Embodiment 1 will be described with reference to the drawings. The watch of the present exemplary embodiment is an analog watch with three hands, and provided with a calendar function.

Figure 1:
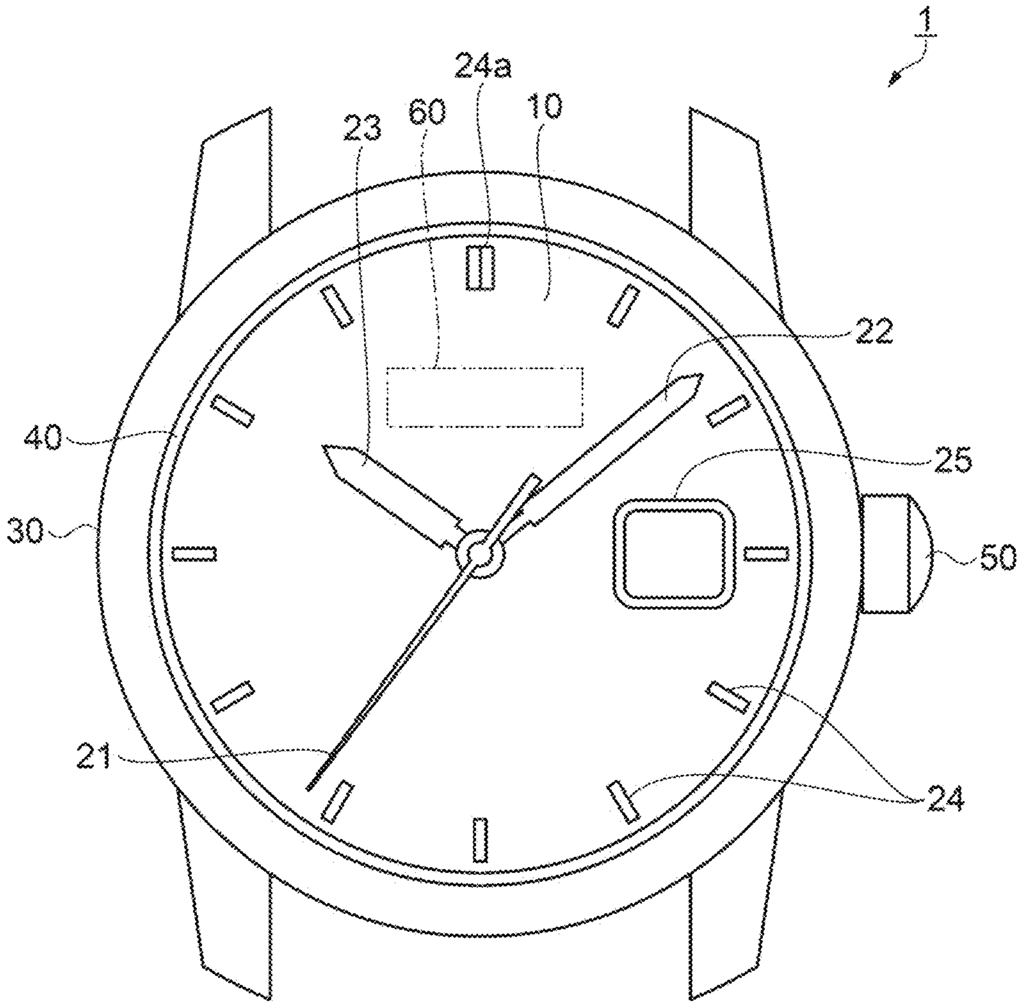
FIG. 1 is a plan view illustrating a schematic configuration of a watch including a dial as a watch component according to Exemplary Embodiment 1.

As illustrated in FIG. 1, a watch 1 includes an outer case 30, a cover glass 40, a dial 10, a seconds hand 21, a minute hand 22, an hour hand 23, a crown 50, and the like.

The outer case 30 is formed of a cylindrical hard metal such as stainless steel or titanium. One opening of the cylindrical outer case 30 is covered with the cover glass 40, and the other opening is closed by a case back. The cover glass 40 side of the watch 1 is a front surface side, and the case back side is a back surface side.

The dial 10 in a disc shape is provided at an inner periphery of the outer case 30. Bar-shaped bar indices 24, which serve as time marks for dividing a circumference into twelve, are provided at an outer peripheral portion on the front surface side of the dial 10. In a 12 o'clock direction, a bar index 24*a* having a different design is disposed. A calendar window 25 in which a date and a day of the week are displayed is provided at a position in a 3 o'clock direction of the dial 10. Furthermore, a decoration 60 of a logo is provided at a position in the 12 o'clock direction of the dial 10. The logo is a logo type which includes characters obtained by designing or decorating a brand name, a corporate name, or the like, or a logo mark that combines a logo type and a symbol mark, and the like.

The three hands of the seconds hand 21, the minute hand 22, and the hour hand 23 that indicate a point of time are provided between the dial 10 and the cover glass 40. A movement for driving the hand is stored between the dial 10 and the case back. A hand shaft that penetrates the dial 10 is provided at a center of the dial 10. The seconds hand 21, the minute hand 22, and the hour hand 23 are coupled to a tip of the hand shaft that is rotationally driven by driving force of the movement. The dial 10, the seconds hand 21, the minute hand 22, the hour hand 23, the calendar window 25, and the like are visible through the cover glass 40.

The crown 50 is provided at a position in the 3 o'clock direction at an outer surface of the outer case 30. By rotating the crown 50, modification of a current time, modification of a calendar display, and the like are possible.

Figure 2:
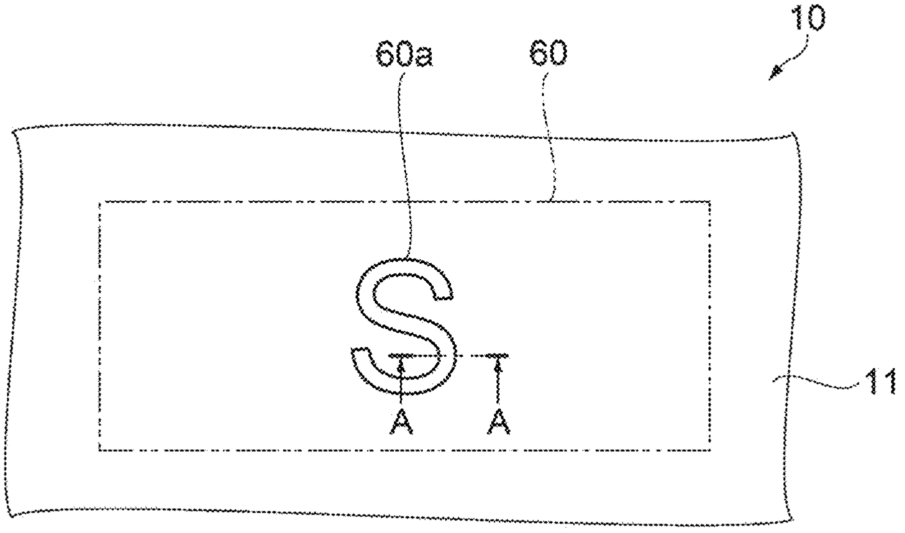
FIG. 2 is a plan view illustrating a decoration portion of the dial.
Figure 3:
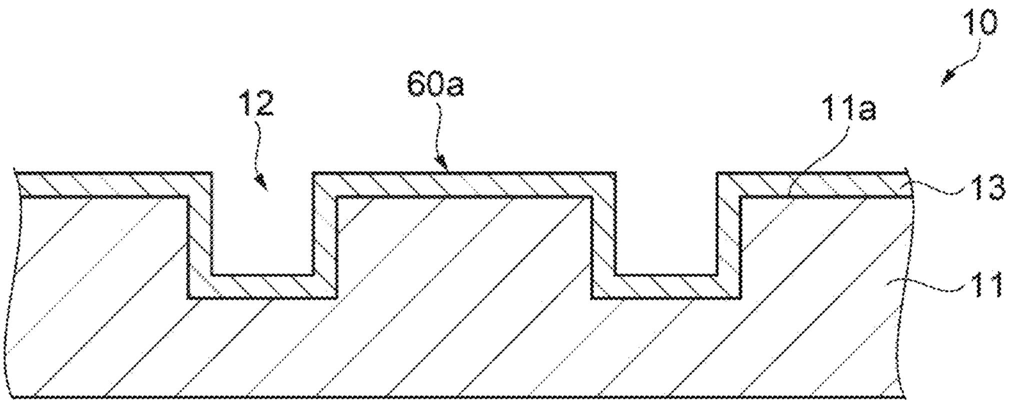
FIG. 3 is a cross-sectional view taken along a line A-A in FIG. 2.

As illustrated in FIGS. 2 and 3, the decoration 60 includes a letter 60*a*, for example, "S". The dial 10 includes the base member 11 made of metal, a recessed portion 12, and a film 13 as a surface treatment layer.

Figure 4:
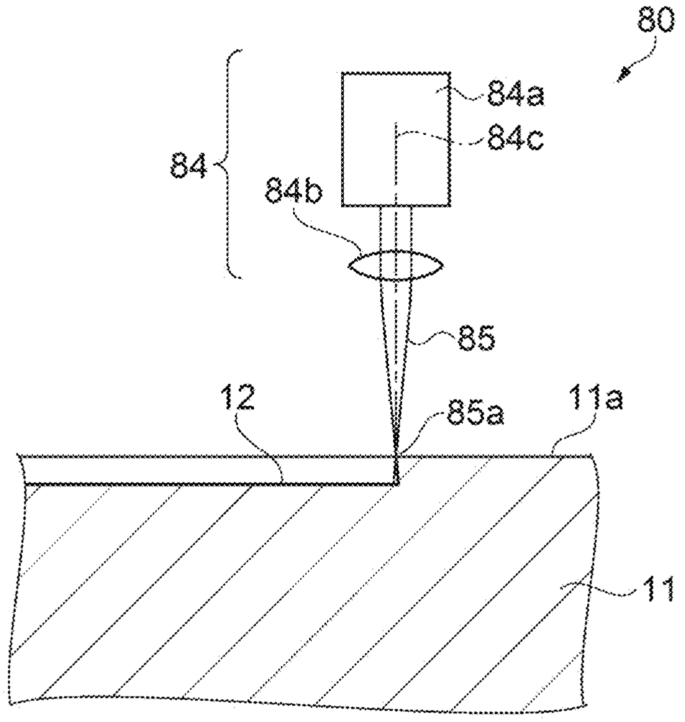
FIG. 4 is a diagram explaining a laser irradiation device.
Figure 5:
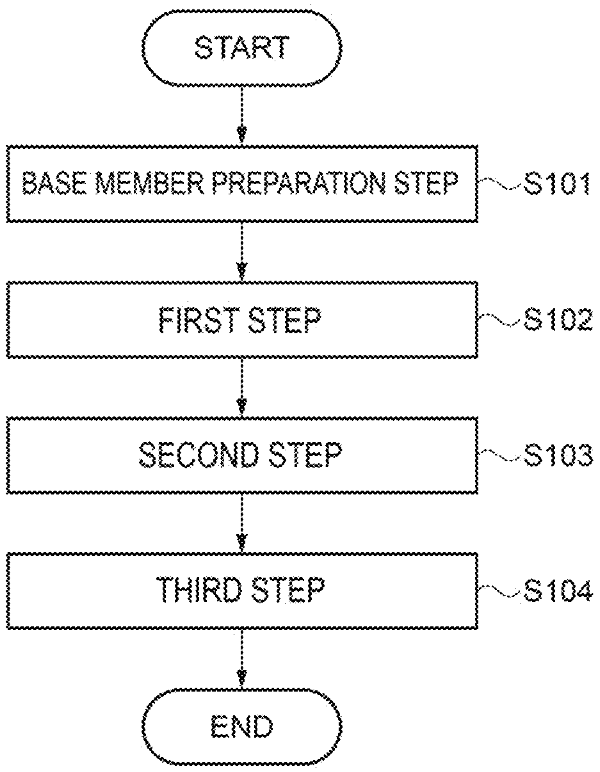
FIG. 5 is a flowchart explaining a method of manufacturing the dial.

The recessed portion 12 is formed by laser machining by a laser irradiation device 80. As illustrated in FIG. 4, the laser irradiation device 80 includes a laser irradiation unit 84. The laser irradiation device 80 includes a mechanism for moving the base member 11 and the laser irradiation unit 84 relatively. For example, the laser irradiation device 80 irradiates a front surface 11*a* of the base member 11 with a laser 85, while moving the laser irradiation unit 84 and the base member 11 relatively along an outer shape of the letter 60*a*. The laser irradiation unit 84 includes a laser emitting unit 84*a* and a focusing optical system 84*b*. The focusing optical system 84*b* focuses the laser 85 at a focus point 85*a*. The focus point 85*a* is formed on an optical axis 84*c* of the focusing optical system 84*b*. Since energy of the laser 85 is large at the focus point 85*a*, the front surface 11*a* of the base member 11 that has absorbed the light of the laser 85 instantly melts, evaporates, and scatters. As a result, the recessed portion 12 can be formed.

The laser 85 output from the laser emitting unit 84*a* may be a femtosecond laser. 1 femtosecond is $10^{-15}$ seconds. The femtosecond laser is a pulse laser that produces an ultrashort pulse with a duration from several femtoseconds to some hundred femtoseconds. As a result, it is possible to perform processing with less heat effect and less heat damage on a periphery of the recessed portion 12. In the decoration 60 of the present exemplary embodiment, a region surrounded by the recessed portion 12 formed in the base member 11 is visible as the letter 60*a*.

The film 13 is a metal film applied by surface treatment on the base member 11. In the dial 10 of the present exemplary embodiment, the film 13 is formed at the front surface 11*a* of the base member 11, and the recessed portion 12.

1-2. Method of Manufacturing Watch Component

A method of manufacturing the dial 10 as a watch component will be described with reference to FIGS. 5, 6, and 7A to 7C. In the method of manufacturing of the present exemplary embodiment, the decoration 60 of the logo is formed.

Figure 6:
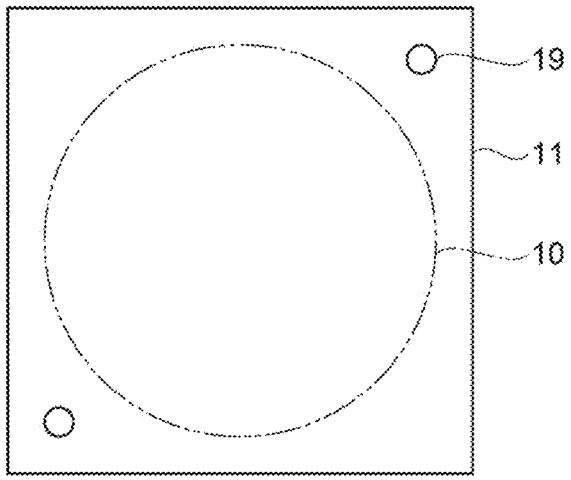
FIG. 6 is a plan view illustrating a process of manufacturing the dial.
Figure 7A:
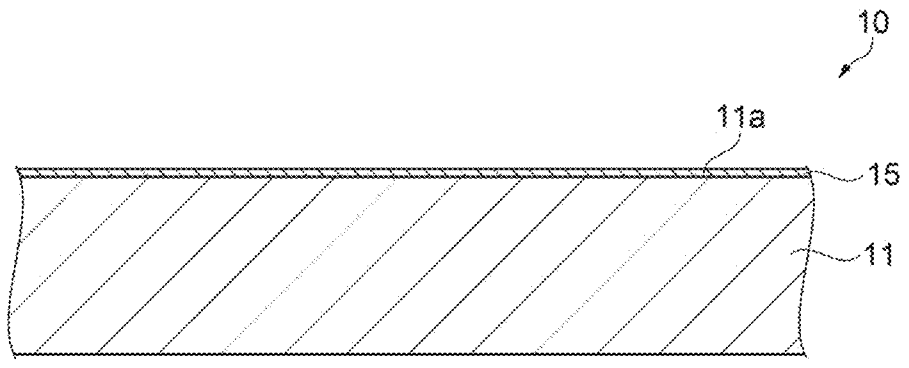
FIG. 7A is a cross-sectional view illustrating a process of manufacturing the dial.

Step S101 is a base member preparation step of preparing the base member 11. The base member 11 illustrated in FIG. 6 is a flat plate made of metal that serves as a base member of the dial 10. In an initial state, as illustrated in FIG. 6, the base member 11 has a substantially square shape, and a center thereof is a forming area of the dial 10 being circular. In a preferred example, the base member 11 is a square of about 40 mm square, and a plate made of brass with a thickness of about 0.3 mm is used. A diameter of the dial 10 is about 33 mm. As a material of the base member 11, a pure metal of any of brass, pure iron, stainless steel, nickel-silver, titanium, and tungsten, or alloy containing any metal can be used. A metal material is oxidized to form a natural oxide film at a front surface thereof. As illustrated in FIG. 7A, a front surface oxide film 15, which is a very thin natural oxide film with a thickness of about 10 nm, is produced at the surface 11*a* of the metal base member 11.

Two reference holes 19 are provided on a diagonal of the base member 11 in the initial state. In a manufacturing step, the base member 11 is set to a jig provided with a reference pin corresponding to the reference hole 19 in units of 10 to 20 sheets, and is processed in each step in a state of being positioned. Note that, in the manufacturing step, the base member 11 may be flowed and processed one at a time.

Figure 7B:
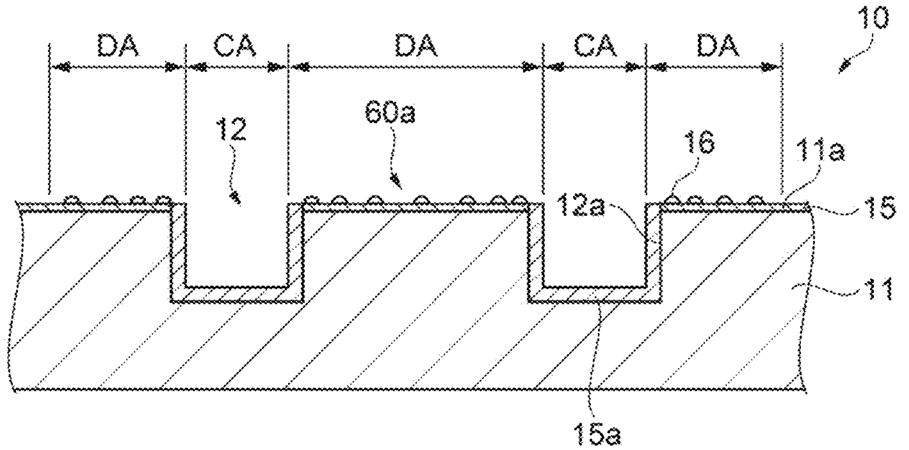
FIG. 7B is a cross-sectional view illustrating a process of manufacturing the dial.

Step S102 is a first step of irradiating the base member 11 with the laser 85 to form the recessed portion 12 in the base member 11. The laser 85 irradiates the surface 11*a* of the base member 11 while the laser irradiation unit 84 of the laser irradiation device 80 is moved relative to the front surface 11*a* of the base member 11 illustrated in FIG. 7A. Irradiation intensity of the laser 85 irradiating the base member 11 can be varied by at least one of pulse output, a pulse repetition frequency, movement velocity at which the base member 11 and the laser irradiation unit 84 are moved relatively, and a distance between the laser irradiation unit 84 and the base member 11. In the first step, irradiation with the laser 85 was performed at irradiation intensity with pulse output of 64%, a pulse repetition frequency of 505 kHz, and movement velocity of 1000 mm/s. As a result, the recessed portion 12 having a depth of about 4 μm and a groove shape is formed as illustrated in FIG. 7B. Note that, the pulse output indicates output with respect to maximum output of the laser irradiation device 80 in % The laser irradiation device 80 used is AGIECHARMILLES LASER P400, manufactured by GF Machining Solutions.

As illustrated in FIG. 7B, due to the irradiation with the laser 85, melted substances of the base member 11 scatter, become microparticles, and adhere to the front surface 11*a* of the base member 11 that is continuous with the recessed portion 12. The microparticles adhering to the front surface 11*a* of the base member 11 are referred to as debris 16. The front surface 11*a* of the base member 11 that is continuous with the recessed portion 12 refers to the front surface 11*a* of the base member 11 continuous in a direction away from an edge of the recessed portion 12 where a side wall 12*a* of the recessed portion 12 and the front surface 11*a* of the base member 11 meet. An amount of the debris 16 that adheres to the front surface 11*a* of the base member 11 tapers as a distance from the edge of the recessed portion 12 increases along the front surface 11*a* of the base member 11.

The recessed portion 12 is formed at a site irradiated with the laser, and the metal material, which is the material of the base member 11, is exposed, so a new natural oxide film is produced on a front surface thereof. The natural oxide film increases in growth rate in proportion to temperature. As illustrated in FIG. 7B, the front surface of the recessed portion immediately after the recessed portion 12 is formed is in a state at a high temperature due to the laser irradiation, a recessed portion oxide film 15*a*, which is a thicker natural oxide film than the front surface oxide film 15 that is present at the front surface 11*a* of the base member 11 not irradiated with the laser, is formed at the recessed portion 12.

Step S103 is a second step of irradiating the base member 11 in which the recessed portion 12 is formed with the laser 85, to clean the base member 11. In the second step of Exemplary Embodiment 1, cleaning is performed in which the debris 16 adhering to the front surface 11*a* of the base member 11, the front surface oxidized film 15 at the front surface 11*a* of the base member 11, and the recessed portion oxide film 15*a* produced in the recessed portion 12 are simultaneously removed. When the debris 16 and the front surface oxide film 15 and the recessed portion oxide film 15*a* are removed, an entire surface of the base member 11 including a region CA of the recessed portion 12 and a region DA of the front surface 11*a* of the base member 11 continuous with the recessed portion 12 to which the debris 16 adheres, is irradiated with the laser 85. The laser 85 irradiates the base member 11 at irradiation intensity that is less than the irradiation intensity of the laser 85 for irradiation when the recessed portion 12 is formed. In the second step, the irradiation with the laser 85 was performed at irradiation intensity with pulse output of 34%, a pulse repetition frequency of 505 kHz, and movement velocity of 1300 mm/s.

Figure 7C:
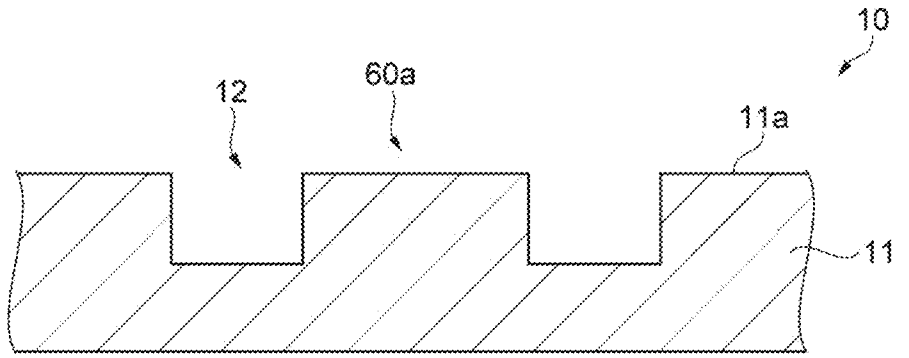
FIG. 7C is a cross-sectional view illustrating a process of manufacturing the dial.
Figure 8A:
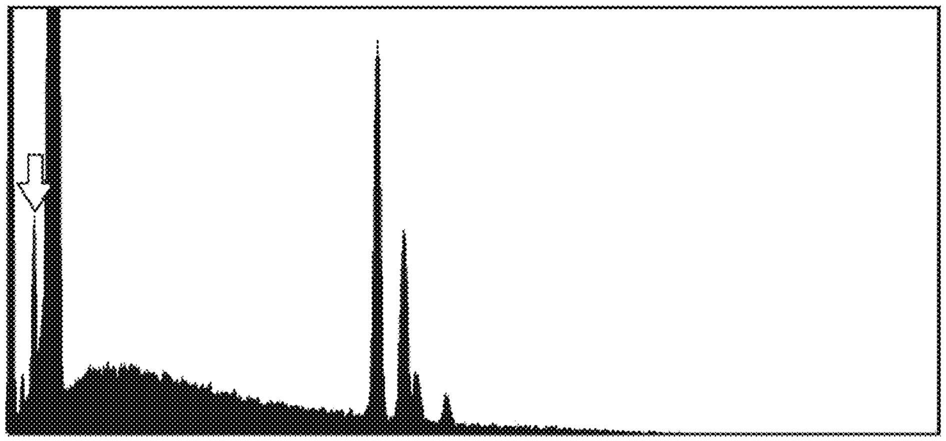
FIG. 8A is a diagram illustrating an X-ray spectrum of a base member.
Figure 8B:
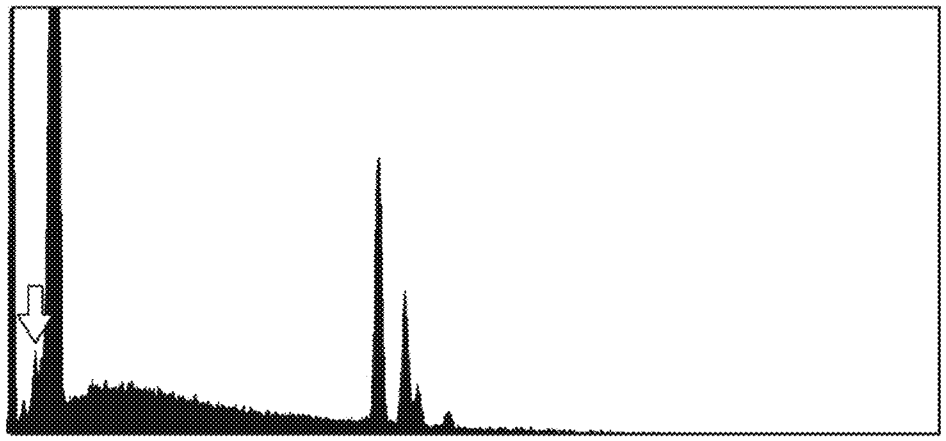
FIG. 8B is a diagram illustrating an X-ray spectrum of the base member.

FIGS. 8A and 8B are results of qualitative analysis of the base member 11 using an energy dispersive X-ray (EDX) analyzer. FIG. 8A shows an X-ray spectrum of the front surface 11*a* of the base member 11 illustrated in FIG. 7B. FIG. 8B shows an X-ray spectrum of the front surface 11*a* of the base member 11 illustrated in FIG. 7C. A characteristic X-ray is displayed as a narrow peak, and an element can be known by knowing energy at a center thereof. An arrow illustrated in FIGS. 8A and 8B represents a peak of an oxygen element. As shown in FIG. 8B, by cleaning the front surface 11*a* of the base member 11 with laser irradiation, the peak of the oxygen element was reduced, and concentration thereof was reduced from 10.4% to 3.4%. In the second step, by adjusting the irradiation intensity of the laser 85 irradiating the base member 11, a part or all of the front surface oxide film 15 and the recessed portion oxide film 15*a* can be removed in a thickness direction of the base member 11. The debris 16 adhering above the front surface oxide film 15 is removed with the front surface oxide film 15. As a result, as illustrated in FIG. 7C, the front surface oxide film 15 and the recessed portion oxide film 15*a* produced at the base member 11, and the debris 16 adhering above the front surface oxide film 15 can be removed.

Step S104 is a third step of performing surface treatment on the base member 11 after the cleaning. In the third step, the film 13 is formed as the surface treatment on the base member 11 in which the recessed portion 12 is formed. For example, the surface treatment is performed by electrolytic or electroless plating, and the front surface 11*a* of the base member 11 and the recessed portion 12 are covered with a metal film having a predetermined thickness. Gold, silver, copper, chromium, nickel, or the like is used as a material of the film 13. The film 13 can be formed by any of vapor deposition and sputtering, in addition to the plating. As a result, the dial 10 having the cross-sectional shape illustrated in FIG. 3 is completed. Note that, the film 13 may be a stacked film in which a plurality of materials are stacked. Furthermore, the film 13 may be formed by patterning resin or lacquer other than metal at the base member 11. Note that, when the third step is performed without performing the second step, glossiness of a plating surface is compromised due to an effect of the debris, which leads to a cloudy texture.

The flow ends by cutting out the circular dial 10 from the square base member 11 having the decoration 60 formed by the first step to the third step.

As described above, according to the method of manufacturing the watch component, and the watch component according to Exemplary Embodiment 1, the following advantages can be provided.

The method of manufacturing the watch component includes the first step of irradiating the base member 11 with the laser 85 to form the recessed portion 12 in the base member 11, the second step of irradiating the base member 11 in which the recessed portion 12 is formed with the laser 85 with the irradiation intensity less than the irradiation intensity of the first step, to clean the base member 11, and the third step of performing the surface treatment on the base member 11 after the cleaning.

In the laser irradiation in the first step of forming the recessed portion 12, the debris 16 adheres to the periphery of the recessed portion 12. The method of manufacturing of the present exemplary embodiment includes the second step of cleaning the base member 11 by the laser irradiation with the irradiation intensity less than the irradiation intensity of the first step, thus the debris 16 can be removed without damaging the base member 11. As a result, the film 13 having a favorable appearance is formed in the third step. Accordingly, a watch component with improved design quality, and a method of manufacturing a watch component that enhances design quality of a watch can be provided.

In the second step, the region including the region CA of the recessed portion 12 and the region DA of the front surface 11*a* of the base member 11 continuous with the recessed portion 12 to which the debris 16 adheres, is irradiated with the laser 85.

The recessed portion oxide film 15*a* is formed at the recessed portion 12 formed in the first step. In the second step, the recessed portion 12, and the front surface 11*a* of the base member 11 continuous with the recessed portion 12 are irradiated with the laser 85, thereby allowing the front surface oxide film 15 and the recessed portion oxide film 15*a* and the debris 16 to be removed simultaneously.

The laser 85 irradiating the base member 11 is a pulsed laser. The irradiation intensity can be varied by at least one of the pulse output, the pulse repetition frequency, the movement velocity of the relative movement, and the distance between the laser irradiation unit 84 and the base member 11. As a result, the irradiation intensity of the laser 85 irradiating the base member 11 can be suitably varied.

The base member 11 is a pure metal of any of brass, pure iron, stainless steel, nickel-silver, titanium, and tungsten, or alloy containing any metal, thus can be suitably applied with the decoration 60 by the laser 85.

Because the film 13 is formed by any of the plating, the vapor deposition, and the sputtering, the film 13 can be easily formed at the base member 11.

The watch component includes the base member 11, the recessed portion 12 formed by irradiating the base member 11 with the laser 85, and the film 13 formed at the base member 11 cleaned by irradiating the base member 11 in which the recessed portion 12 is formed with the laser 85 with the irradiation intensity less than the irradiation intensity at which the recessed portion 12 is formed.

In the laser irradiation to form the recessed portion 12, the debris 16 adheres to the periphery of the recessed portion 12. The base member 11 to which the debris 16 adheres is cleaned by the laser irradiation with the irradiation intensity less than the irradiation intensity at which the recessed portion 12 is formed, and thus the debris 16 is removed without damaging the base member 11. As a result, the film 13 has a good appearance. Accordingly, a watch component with improved design quality, and a watch component that enhances design quality of a watch can be provided.

2. Exemplary Embodiment 2

A configuration of a dial as a watch component, and a method of manufacturing a watch component according to Exemplary Embodiment 2 will be described. Note that, a flowchart describing the method of manufacturing the watch component of the present exemplary embodiment is the same as that of Exemplary Embodiment 1, and thus illustration thereof is omitted. Furthermore, steps S101 and S102 performed in the present exemplary embodiment are the same as those of Exemplary Embodiment 1, and thus descriptions thereof will be omitted. The method of manufacturing of the present exemplary embodiment differs from that of Exemplary Embodiment 1 in a region where the base member 11 is irradiated with the laser 85 in step S103, and a region where the film 13 is formed in step S104.

Figure 9:
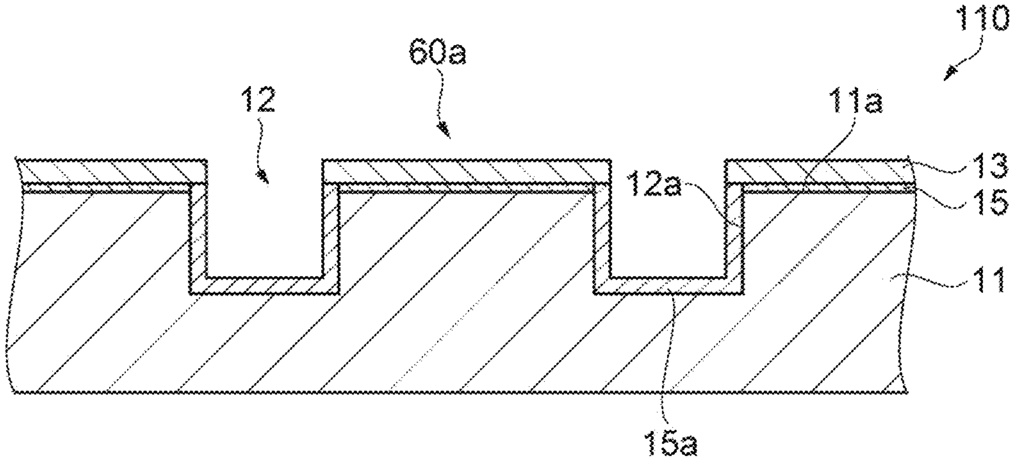
FIG. 9 is a cross-sectional view of a dial as a watch component according to Exemplary Embodiment 2.

As illustrated in FIG. 9, a dial 110 includes the base member 11 made of metal, the recessed portion 12, and the film 13. The front surface oxide film 15 and the recessed portion oxide film 15*a* remain without being removed, at the front surface 11*a* of the base member 11 and the recessed portion 12. The film 13 is formed only at the front surface 11*a* of the base member 11. The recessed portion 12 is formed in a first step of step S102 to cause the letter 60*a* of the decoration 60 such as a logo to be visible.

Figure 10:
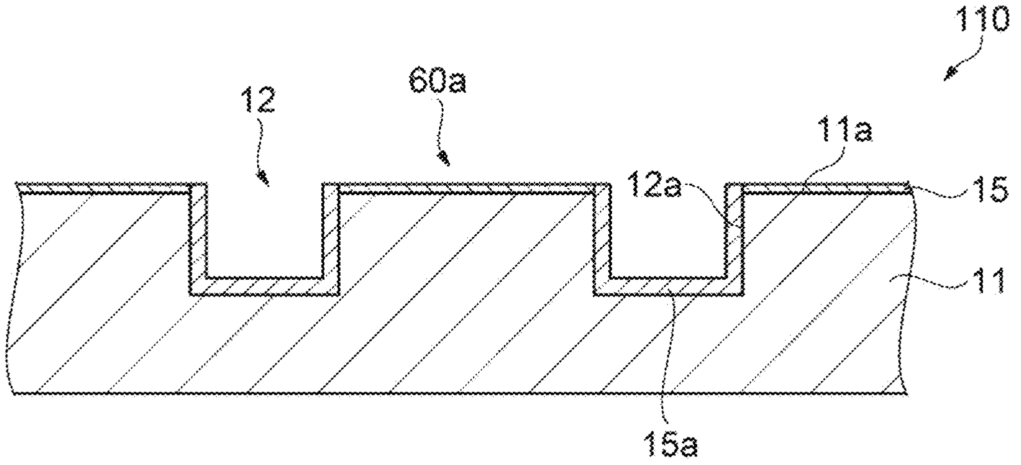
FIG. 10 is a cross-sectional view illustrating a process of manufacturing the dial.

In a second step of step S5103 in Exemplary Embodiment 2, cleaning is performed in which only the debris 16 adhering to the front surface 11*a* of the base member 11 illustrated in FIG. 7B is removed. When only the debris 16 is removed, a region including the region DA of the front surface 11*a* of the base member 11 continuous with the recessed portion 12 to which the debris 16 adheres is irradiated with the laser 85. The laser 85 irradiates the base member 11 at irradiation intensity less than the irradiation intensity of the laser 85 for the irradiation in the second step in Exemplary Embodiment 1. In other words, the debris 16 can be removed with the laser 85 with the irradiation intensity less than the irradiation intensity of the laser 85 for the irradiation to remove the front surface oxide film 15 and the recessed portion oxide film 15*a*. In other words, varying the irradiation intensity of the laser 85 allows only the debris 16 to be removed leaving the front surface oxide film 15 and the recessed portion oxide film 15*a*. In the second step in Exemplary Embodiment 2, the irradiation with the laser 85 was performed at irradiation intensity with pulse output of 28%, a pulse repetition frequency of 505 kHz, and movement velocity of 1300 mm/s. As a result, as illustrated in FIG. 10, only the debris 16 adhering above the front surface oxide film 15 produced at the base member 11 can be removed.

Figure 11A:
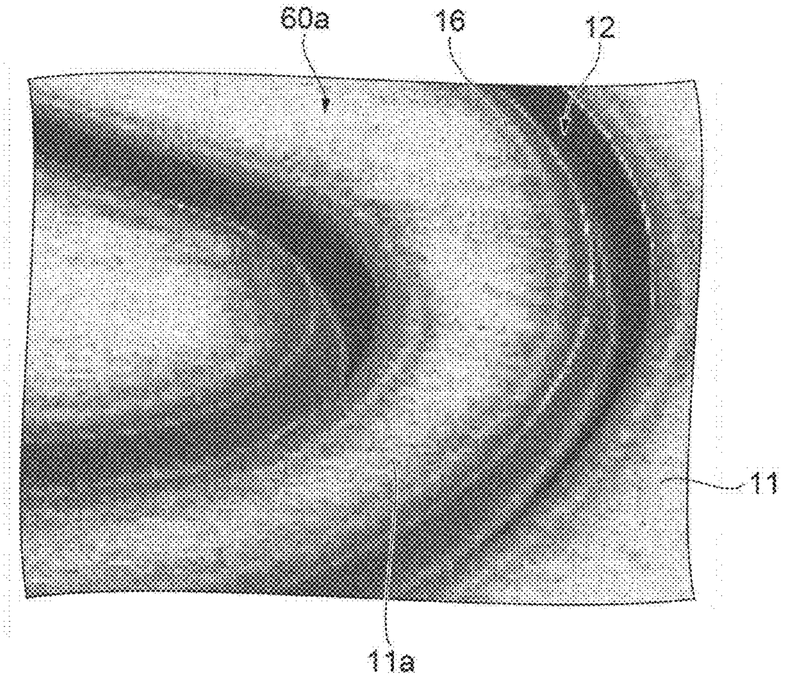
FIG. 11A is an image in the process of manufacturing the dial.
Figure 11B:
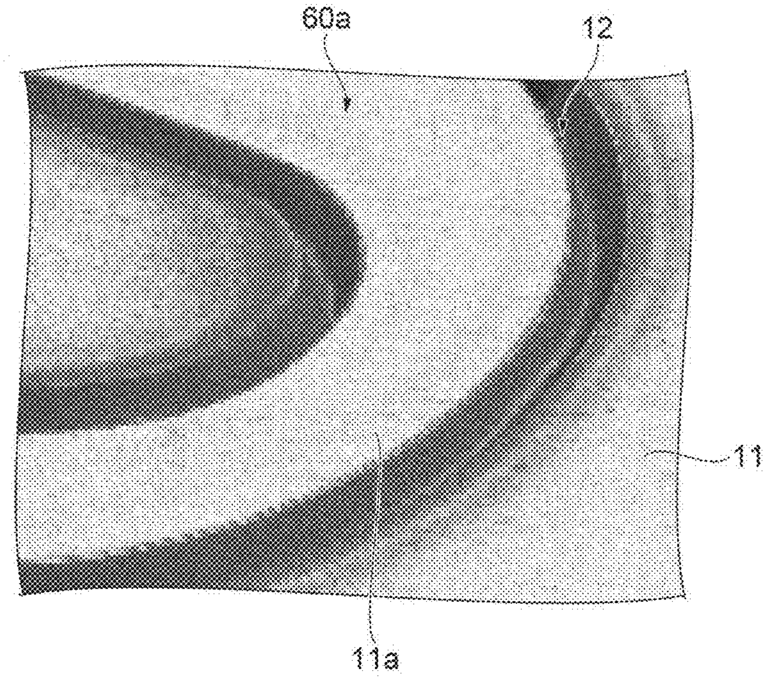
FIG. 11B is an image in the process of manufacturing the dial.

FIGS. 11A and 11B are images of the base member 11. FIG. 11A is an image in which the front surface 11*a* side of the base member 11 illustrated in FIG. 7B is imaged. FIG. 11B is an image in which the front surface 11*a* side of the base member 11 illustrated in FIG. 10 is imaged. As illustrated in FIG. 11A, the debris 16 adhering to the front surface 11*a* of the base member 11 continuous with the recessed portion 12 when the recessed portion 12 is formed is visible as black. As illustrated in FIG. 11B, by cleaning the front surface 11*a* of the base member 11 with the laser irradiation, the debris 16 visible as black is reduced, brightness of the front surface 11*a* of the base member 11 is increased, and is visible as bright. In the irradiation of the laser 85, the front surface oxide film 15 and the recessed portion oxide film 15*a* are not removed. Accordingly, the recessed portion 12 is covered with the recessed portion oxide film 15*a* that is thicker than the front surface oxide film 15 at the front surface 11*a* of the base member 11. Since the oxide film absorbs transmitted light, the brightness of the recessed portion 12 is reduced and the film is visible as dark.

In a third step of step S104 in Exemplary Embodiment 2, surface treatment is performed on the front surface 11*a* of the base member 11 other than the recessed portion 12 to form the film 13. As a result, the dial 110 having the cross-sectional shape illustrated in FIG. 9 is completed.

As described above, according to the method of manufacturing the watch component according to Exemplary Embodiment 2, the following advantages can be provided.

In the second step, the region including the region DA of the front surface 11*a* of the base member 11 continuous with the recessed portion 12 to which the debris 16 adheres, is irradiated with the laser 85.

In the laser irradiation in the first step of forming the recessed portion 12, the debris 16 adheres to the periphery of the recessed portion 12. In the second step, the front surface 11*a* of the base member 11 continuous with the recessed portion 12 is irradiated with the laser 85 to allow removal of the debris 16.

In the second step, the irradiation intensity of the laser 85 when the laser 85 irradiates the region including the region DA of the front surface 11*a* of the base member 11 continuous with the recessed portion 12, that is, the irradiation intensity for removing the debris 16 is less than the irradiation intensity of the laser 85 when the laser 85 irradiates the region including the region DA of the front surface 11*a* of the base member 11 continuous with the recessed portion 12 and the region CA of the recessed portion 12, that is, the irradiation intensity for removing the debris 16 and the front surface oxide film 15 and the recessed portion oxide film 15*a*.

Since the debris 16 can be removed with the irradiation intensity less than when removing the front surface oxide film 15 and the recessed portion oxide film 15*a*, only the debris 16 among the debris 16 and the front surface oxide film 15 and the recessed portion oxide film 15*a* can be selectively removed.

A thickness of the recessed portion oxide film 15*a* in the recessed portion 12 is greater than a thickness of the front surface oxide film 15 in the front surface 11*a* of the base member 11.

Since the oxide film absorbs transmitted light, the recessed portion 12 covered with the thick recessed portion oxide film 15*a* can be made to be visible as darker than the front surface 11*a* of the base member 11 covered with the thin front surface oxide film 15. As a result, a superior contrast decoration can be formed. In addition, since the film 13 is formed at the front surface 11*a* of the base member 11, contrast can be further improved.

Note that, in Exemplary Embodiment 1 and Exemplary Embodiment 2, the dials 10 and 110 as the watch components having the decoration 60 of the logo provided at the position in the 12 o'clock direction have been exemplified, however, the decoration may be a graphic, a pattern, alphanumeric characters, a mark, a background pattern of the dial, and the like provided at a position not particularly specified on the dial. Also, the watch component may be the outer case 30, the crown 50, the seconds hand 21, the minute hand 22, the hour hand 23, a case back, a bezel, a dial ring (not illustrated), or the like.

In addition, according to the method of manufacturing the watch component of the present exemplary embodiment, by varying the irradiation intensity of the laser 85 for performing irradiation in the second step, the processing of removing only the debris 16, and leaving the front surface oxide film 15 and the recessed portion oxide film 15*a*, the processing for removing the debris 16 and the front surface oxide film 15 and the recessed portion oxide film 15*a*, and the processing for removing the debris 16, partially eliminating the front surface oxide film 15 and the recessed portion oxide film 15*a* in the thickness direction, and varying the film thickness can be performed.

Also, in addition to the purpose of removing the debris 16, the front surface oxide film 15 and the recessed portion oxide film 15*a* formed above the base member 11 can be partially removed or partially varied in thickness. Furthermore, by combining a region where the thickness of the front surface oxide film 15 or the recessed portion oxide film 15*a* is varied in the second step, and a region of the film 13 formed in the third step, the complex decoration 60 can be formed.

For example, only a part of the recessed portion 12 formed in the first step can be irradiated with the laser 85 in the second step to partially vary the thickness of the recessed portion oxide film 15*a* formed in the recessed portion 12. In addition, the region where the film 13 is formed in the third step can be irradiated with the laser 85 in the second step to remove the front surface oxide film 15 and the recessed portion oxide film 15*a* or to vary the thickness, only in that part. Conversely, a region where the film 13 is not formed in the third step can be irradiated with the laser 85 in the second step to remove the front surface oxide film 15 and the recessed portion oxide film 15*a* or to vary the thickness, only in that part. As a result, the decoration 60 having a different visual effect can be formed.

In the second step exemplified in Exemplary Embodiment 1, the entire surface of the base member 11 is described as irradiated with the laser 85, but not the entire surface but only a main part of the base member 11 may be irradiated with the laser 85. For example, it is also possible that the region CA of the recessed portion 12 is not irradiated with the laser 85, and only the region DA continuous with the recessed portion 12 is irradiated with the laser 85.

In the present exemplary embodiment, the method of manufacturing the watch component at which the film 13 is formed as the surface treatment, and the method of manufacturing the watch component at which the film 13 is formed have been exemplified, but the surface treatment may be surface treatment for mirror polishing the front surface 11*a* of the base member 11. As a result, a watch component having a glossy surface for which texture of the base member 11 is taken advantage of can be formed.

What is claimed is:

1. A method of manufacturing a watch component with a base member decorated by performing laser irradiation while relatively moving a laser irradiation unit and the base member made of metal, the method comprising:

a first step of irradiating the base member with the laser to form a recessed portion in the base member;

a second step of irradiating, with the laser, the base member in which the recessed portion is formed at irradiation intensity less than irradiation intensity of the first step, to clean the base member; and a third step of performing surface treatment on the base member after the cleaning, wherein the second step includes two cases: a first case is to irradiate, with the laser, both a first region of the recessed portion and a second region of a front surface of the base member continuous with the recessed portion, and a second case to irradiate, with the laser, the second region, and an irradiation intensity in the second case is less than an irradiation intensity in the first case.

2. The method of manufacturing a watch component according to claim 1, wherein the laser is a pulse laser, and the irradiation intensity is varied by at least one of a pulse output, a pulse repetition frequency, a movement velocity of the relative movement, and/or a distance between the laser irradiation unit and the base member.

3. The method of manufacturing a watch component according to claim 1, wherein the base member is formed of a metal material that is selected from the group consisting of brass, pure iron, stainless steel, nickel-silver, titanium, tungsten, and alloys containing any metal.

4. The method of manufacturing a watch component according to claim 1, wherein in the surface treatment, a film is formed by any of plating, vapor deposition, and sputtering.

5. The method of manufacturing a watch component according to claim 1, wherein a thickness of an oxide film in the recessed portion is greater than a thickness of an oxide film at a front surface of the base member.

6. A watch component manufactured according to the method of claim 1.

7. The method of manufacturing a watch component according to claim 1, wherein the second case leaves each of a front surface oxide film formed at the front surface of the base member and a recessed portion oxide film formed at the recessed portion.

8. The method of manufacturing a watch component according to claim 7, wherein a thickness of the recessed portion oxide film is greater than a thickness of the front surface oxide film.

* * * * *